Patented Nov. 15, 1938

2,137,169

UNITED STATES PATENT OFFICE 2,137,169

MEDICINAL DRESSING MATERIAL

Harold Alvin Levey, New Orleans, La.

No Drawing. Application June 10, 1936,
Serial No. 84,563

11 Claims. (Cl. 167—84)

The present invention relates to a flexible self-sustaining transparent medicinal dressing material, comprising a carbohydrate film, the term "self-sustaining" being used to denote a film which is capable of physical existence as such without being carried or supported upon any surface upon which it is spread.

The film may be made from any of the water-soluble carbohydrates from the starches down through most of the sugars, as for example "amylin", the dextrines, the starch gums, the saccharides, the water-soluble carbohydrate gums, such as acacia or the like, the pentoses, and ethers and esters thereof and many polyhydric alcohols of relatively high molecular weight.

In one form of the invention, it is desirable to provide a water-soluble carbohydrate transparent self-sustaining film which is inherently adhesive, said water-soluble carbohydrate film being coated preferably on one side with a waterproofed protective transparent coating to increase the general utility of the film. A film of the character above described is well adapted for use as an adhesive tape or medium. If the tapes are not waterproofed on one side, the handling of these tapes become difficult and an uncomfortable task. In addition, in the manufacture of the adhesive tape in accordance with the present invention, the tape is preferably wound on spools, and if one side of the film were not adhesive in character, it would not be necessary to wind a strip of waxed paper or the like between laminations to prevent adhesion of the laminae to each other.

While a water-soluble starch base is the preferred material for forming the film, it is desired to point out that all water-soluble carbohydrates which have the property of producing self-sustaining films may be utilized, and in the preferred form of the invention, it is desired that these self-sustaining films be transparent. Cellulose is the only carbohydrate which is not water-soluble to any degree whatsoever. Several forms of hemi-celluloses are water-soluble. Further, gama-cellulose which results from the alkali treatment of all forms of natural cellulose, produces a water-soluble carbohydrate. Certain of the sugars also are water-soluble to only a minor extent. Starch, before it is cooked, is insoluble in water. It is only after the cooking operation that the starch becomes water soluble.

It is desired to further point out that a properly selective and processed water-soluble carbohydrate, as for example starch, will produce without the addition of any of the addition products herein set forth, a transparent film. This film when coated with a correctly formulated lacquer or coating composition will form a composite film of glass-like transparency.

Preferably, the self-sustaining film in the form of an adhesive medium, such as an adhesive tape or a medicinal dressing material, is made from a starch derivative, or stated differently, from a starch base, as for example starch hydrate, hydrolyzed starch, dextrinized starch, water soluble starch esters and water-soluble starch ethers, such as the methyl, ethyl and benzyl starch ethers. Starch acetate, starch nitrate and starch xanthate are examples of water-soluble starch esters. The adhesive medium of the present application may be made from a mixture of various water-soluble carbohydrates if the constituents of the mixture are compatible with each other. For example, a mixture of starch bases may be utilized to make the film. A mixture of a starch base, such as dextrinized starch and starch nitrate, or a starch base and starch acetate, or a starch base, as for example, dextrinized starch and starch ethers, may be used to provide the film, provided these starch derivatives are water-soluble and, therefore, compatible with the starch hydrate of the present invention.

At this point it is desired to state that the term "starch base" includes starch derivatives and starch degradation products. The term "starch derivative" is intended to cover any product which may be obtained from starch as a starting point and which contains in its molecule a more or less modified form of starch. The term "starch derivative" includes such products as starch esters and starch ethers, dextrines and sugars may be classified as "starch degradation products". Starch hydrate and partially hdrolyzed starch, which is really starch itself, responds to the blue iodine test, which appears to be the criterion to determine the presence of starch. The degradation products which may be completely or partially degraded, do not give the blue iodine test. For example, a degraded product consisting of so-called erythro dextrine gives a red iodine coloration, while totally dextrinized starch gives no color reaction with iodine. Further, on complete hydrolysis by acid treatment or with enzymes or bacteria of the proper type, a theoretically one hundred per cent (100%) yield of dextro glucose should result.

The term "starch hydrate" as used in the present specification, covers the product which results from the heating of the vegetable starches with a substantial amount of water in a nearly neutral solution to the bursting of the granules, and continued heating at substantially the bursting temperature until the plastic mass clarifies. Research work indicates that starch treated as above set forth is the least degraded form of starch. The molecular aggregate is very high and gives the characteristic blue iodine test and almost a theoretical yield of glucose.

It is desired to state that when the starch is treated with alkali, such as caustic soda, in relatively small amounts, as for example, in amounts less than six per cent (6%), the degradation of the starch is relatively small, as shown by the blue iodine coloration. Practically none of the starch is converted into dextrines or sugars.

In one form of the present invention the starch hydrate base may have affixed thereto a starch nitrate coating to provide a composite film which has inherent adhesive properties or one which does not have any adhesive properties. The above is an example of a composite self-sustaining transparent water-soluble carbohydrate film which does not have a waterproof coating. If desired, either the starch hydrate face or the starch nitrate face may be provided with a waterproofed coating. While in the present specification, it is indicated that the coating which is applied to the starch, and preferably a starch base which is inherently adhesive, is desirably a waterproofed coating, it is to be understood that any coating may be applied which will function to destroy the inherently adhesive properties of the exposed facing of the film. The adhesive properties, as later on pointed out, may be destroyed without providing any coating whatsoever.

If any of the addition products hereinafter set forth tend to have a disintegrating effect upon the starch plastic, then the production of a continuous self-sustaining film involves mechanical difficulties. In order to eliminate the latter, the product of the present invention may be made in the form of two laminations. A normal starch film may be coated on one side with a waterproofing coating, exemplified by a nitrocellulose lacquer, and on the other side with a starch lamination carrying the desired medicinal material. This gives a three lamination composite film comprising a film of starch and medicinal on the outside surface, an intermediate base film of normal starch, and a waterproofing film, as for example, a cellulose derivative.

In one form of the invention, one surface or side of the medicinal dressing or film carries a flexible waterproofing coating, and the other side is free of the waterproofing coating, but is preferably, although not necessarily, adhesive in character so that it will easily bond itself to any surface to which it is applied.

The medicinal dressing material of the present invention may be used as an adhesive tape, as a medicated tape, or as a surgical dressing tissue.

There may be incorporated in the carbohydrate film pharmaceutical products, medicinals and antiseptics. Generally speaking, almost any type of liquid or solid medicinal may be incorporated in the film, said medicinal being adapted to act on the skin or through the skin to produce a desired physiological and/or pharmacological reaction.

The following is a specific example of the preparation of the medicinal dressing material in accordance with the present invention. While the preparation of a starch film is set forth, it is to be understood that the procedure set forth is applicable to the treatment of all water-soluble carbohydrates which will form a self-sustaining fairly transparent medicinal dressing film.

Any of the available starches may be used for preparing the film, although preference is given to the root starches rather than to the cereal starches. Examples of suitable starches are those derived from corn, potato, arrow-root, rice, cassava, or the like. The use of cassava starch is highly desirable, as this produces the toughest, clearest and strongest self-sustaining films.

Utilizing cassava starch, the latter is mixed with about six (6) to ten (10) times its weight of water, to which may be added an alkali which will assist in bursting the granules of starch to produce a gelatinous mass. Any alkali may be used as a treating agent, but it is preferred to use caustic soda. The amount of caustic soda used will vary in accordance with the desired adhesiveness of the final starch hydrate film, and it generally may be stated that the caustic soda may be added in an amount equal to one-half (½) of one per cent (1%) to four per cent (4%), based on the weight of the dry starch.

Broadly, in order to produce the medicinal starch film of the present invention, the starch, such as cassava starch, is treated so as to cause the granules of starch to swell and disintegrate, and produce a gelatinous mass, which clarifies into a more or less transparent stringy plastic. Therefore, any agent may be used which performs the above function. Instead of using caustic soda, potassium hydroxide, ammonium hydroxide, lithium hydroxide and similar compounds may be used.

Instead of using alkalies, the amines, such as di-methyl amine and related homologs of this series may be used. Instead of using caustic alkalies, other alkalies may be used, such as sodium carbonate. Basic salts and readily hydrolyzable salts of weak acids may also be used. Generally stated, the starch solution or any water-soluble carbohydrate may be mixed with water, or any material which will perform the same function as water, and a small amount of acid, base, salt, oxidizing agent, catalyst, enzymatic substance, bacteria, or any material which will break down the starch or water-soluble carbohydrate material into a more or less transparent mass.

The amount of alkali or equivalent agents used will determine the adhesiveness of the starch hydrate film. Using alkalies other than caustic soda, or other treatment agents, so much thereof will be added which will produce a pH or alkalinity in the cooking operation equivalent to that produced by the caustic soda in the amount specified.

The starch mass which has been treated with the alkali is heated, preferably, in a water jacket with continued stirring to about 160° F. This is the preferred temperature in the case of cassava starch. For other starches, the temperatures will be different.

The time that the starch is treated with the disintegrating agent will, of course, vary with the character of the starch and the character of the disintegrating agent. An additional factor influencing the time of treatment is the size and shape of the treatment container. In the above specific example, the cooking of the cassava starch is carried out in a one gallon cylindrical vessel, whose diameter and height are preferably the same. The time of cooking is about twenty (20) minutes to one-half hour, after the starch reaches the temperature of about 165° F. This temperature is, preferably, although not necessarily, maintained approximately constant during the cooking operation.

The excess alkali present in the starch solution is preferably neutralized with any suitable neutralizing agent, but preferably with phosphoric acid, using phenol phthalein as an indicator.

Nearly all of the inorganic acids and organic acids are the chemical equivalents of phosphoric acid as a neutralizing agent, except those acids which have an oxidizing effect, such as nitric acid, chloric acid, per chloric acid, chromic acid, and similar compounds. Phosphoric acid is preferred, since it appears to produce a plastic with better flowing properties. However, in view of the fact that only a few per cent of the neutralizing agent is necessary, sulphuric, hydrochloric, acetic and oxalic acids may well be used.

A medicinal dressing film produced from the above mass is inherently adhesive because the starch has been cooked under alkaline conditions. In other words, an alkaline cook produces an adhesive film, the adhesive qualities of which vary within limits in accordance with the amount of alkali produced.

Under some conditions, it may be desirable to produce an adhesive medium such as an adhesive tape or a medicinal dressing film which does not possess an adhesive surface to produce a starch hydrate film or a water soluble carbohydrate film which does not have an adhesive surface, and in order to do so it is merely necessary to cook the starch under neutral or non-alkaline condition, that is, maintain a pH as near 7 as possible. In all events, it is important to avoid an alkali cook when it is desired to produce a film with a non-adhesive surface. For some kinds of starch or water-soluble carbohydrates, it may be best to cook under alkaline conditions to produce an adhesive surface, and then treat the surface to make it non-adhesive. Any prior sort of art material which will effect this operation can be used. For example, the surface may be treated with anhydrous methanol or saturated solution of the alums or similar saline baths. While many salts will effect a de-adhesifying action, about 4% to 10% of borax, based on the weight of the starch, produces a very non-adhesive starch film. Borax appears to be most effective of all the compounds and salts which have been used as de-adhesifying agents.

These agents for de-adhesifying the adhesive surface inhibit the transparency of the film relatively little, but leave a matt surface. If substantially complete transparency is not necessary, most all of the adhesive properties of the film can be removed by the addition of the higher alcohol sodium sulphate soaps, which may be added to the starch cook. These soaps, as well as fats, oils and waxes may be added to the starch plastic before the film-forming operation. The last mentioned groups, however, reduce the transparency of the film to a point almost approaching turbidity. The following is an illustrative example of a composition of a starch hydrate medicinal dressing film which is non-adhesive:

| | Percent |
|---|---|
| Sodium palmityl sulphate | 3 |
| Glycerol | 12 |
| Gum arabic | 15 |
| Cassava starch | 70 |

The starch is cooked to bursting of the granules and the temperature is maintained until the plastic starch clarifies as herein described. Thereafter, the other additives are incorporated in the mass and the film is formed.

It is within the province of the present invention to produce an adhesive medicinal dressing starch hydrate film, or a film from the starch carbohydrate which has both faces of the film adhesive, and de-adhesify one side of the film to produce an article having an adhesive face and a non-adhesive face. This may be accomplished by applying a soap, oil or wax solution on the face it is desired to de-adhesify.

Those films which have little or no adhesive properties may have the adhesive properties intensified by incorporating in the film an adhesive agent. Any agent which will mix well with a starch hydrate solution and become an integral soluble part thereof may be incorporated in any suitable manner in the starch mass. Similarly, any water-soluble carbohydrate which is not inherently adhesive, may have its adhesive qualities increased by adding thereto an adhesive increasing agent. Examples of suitable adhesives are the dextrines and carbohydrate gums, such as arabic, tragacanth, karaya, gum ghatti, irish moss, quince seed, and locust bean, as well as glue, gelatin, casein, alginic compounds, including alginates, and blood and egg albumen.

Where it is desirable to increase the adhesive qualities of the starch hydrate film, the adhesive ingredient may be added in various amounts, generally in amounts from ten to forty per cent (10% to 40%) of the weight of the film. Broadly, however, it may be stated that the adhesive increasing agent may be introduced into the plastic mass in amounts varying from ten per cent (10%) to ninety per cent (90%) of the ultimate weight of the film. When the protein products, such as gelatin, casein, albumen and the like are introduced into the starch hydrate film, the amount should not exceed approximately about fifteen per cent (15%) based on the dry weight of the starch, since around this percentage the transparency of the resulting film is substantially reduced, and borders on translucency. Any amount below fifteen per cent (15%) of the protein adhesive increasing agents may be introduced into the mass.

It is desired to point out that it is within the province of the present invention to produce a non-adhesive water-soluble carbohydrate film, as for example, a water-soluble starch film, and apply another layer of water soluble carbohydrate film over the first layer, said second layer, such as starch, possessing adhesive properties. The outer starch lamination may be prepared from an alkali treated starch to produce an inherently adhesive material, while the initial base film of starch material may be made by a neutral cook.

It is desired to further point out that a non-adhesive water soluble carbohydrate film may be prepared by utilizing a neutral cook, as for example, treating starch under the conditions herein set forth, the starch being non-adhesive, casting the water-soluble carbohydrate into a film, coating one side thereof with a waterproofing medium and then treating the uncoated side with a material which will convert the uncoated surface from a non-adhesive to an adhesive condition. Many methods of carrying out the above will suggest themselves to those skilled in the art. However, the result desired may be obtained by directing a steam jet carrying a few percent of ammonia, the latter functioning as the volatile alkali which will render the surface of the film tacky and adhesive. Any of the composite films referred to in the present specification which do not have an adhesive surface or which were prepared initially with one or both sides non-adhesive, may be converted into self sustaining films having an adhesive face by the procedure above set forth.

To the plastic solution either with or without the adhesive-increasing agent, there is added a suitable plasticizing agent in amounts equivalent to fifteen per cent (15%) to forty per cent (40%) of the weight of the dry starch. The plasticizing agent may be a glycerol or a glycol, as for example, ethylene glycol, propylene glycol, diethylene glycol and similar polyhydric alcohols, as well as the various sugars including the mono-, di- and tri-sacchroses, the pentoses and pentosan gums. It is desired to state that glycerol is especially valuable as a plasticizing agent in the production of transparent self-sustaining water soluble carbohydrate films, as for example, starch films, because glycerol of all the plasticizers, reduces the transparency of the ultimate film the least.

Practically all of the water soluble carbohydrates have a definite plasticizing value for the starch film. If the carbohydrate is substantially hygroscopic, its effectiveness as a plasticizing agent is correspondingly greater than those carbohydrates which are less hygroscopic.

As illustrative of the mono-sacchroses, reference is made to glucose and fructose.

As representative of the di-sacchroses, reference is made to sucrose and maltose.

As representatives of the tri-sacchroses, reference is made to mellitose and raffinose.

Zylose and arabinose are representatives of the pentoses, and mannan and araban are representative of the pentosan gums.

In addition, various natural gums above referred to, and which contain substantial amounts of the pentosan gums are very well suited for this work. These natural gums are gum tragacanth, arabic, karaya, and the like.

In the preferred form of the invention, it is desirable to add to the plastic solution a preservative medium to inhibit organic disintegration and decay of the starch film. Any material may be used, either organic or inorganic, which will so function. Examples thereof are borax, sodium benzoate, sodium salicylate, sodium orthophenylphenate, beta-naphthol and the like. These compounds are set forth by way of example, and not limitation. The amount of preservative added will depend on a number of factors including the character of the starch and the kind of preservative agent used. However, when using borax an amount equal to four per cent (4%) of the weight of the dry starch gives satisfactory results. When using sodium-orthophenylphenate, it is desirable to add one-third (⅓) of one per cent (1%) based on the weight of the dry starch.

Any preservative which will inhibit the decay of organic matter, retard the growth of mold, fungi, bacteria and protozoa will maintain the utility and value of the starch film. Most all of the inorganic salts possess varying degrees of effectiveness in this role, and most of the aromatic organic compounds may be introduced into the starch hydrate mass as a water solution, or if these or any other compounds are not soluble in water, soluble derivatives may be formed and these introduced into the mass. For example, the aromatic hydrocarbons and their derivatives may be sulphonated, or some other treatment effected to bring the insoluble compound into the soluble form. Further, the insoluble compounds may be introduced in the form of an emulsion. Additional examples of the preservatives are the water soluble inorganic salts of such metals as copper, arsenic, mercury, thallium, antimony, and the like. Other effective organic agents inhibiting decay are substantially all of the aromatic alcohols and all of the turpene alcohols, of which cresol, resorcinol, thymol, are representative of the aromatic alcohols; and pineol and borneol, which are representative of the terpene alcohols and are mentioned merely as representative of the terpene alcohols.

In general, it may be stated that the amount of preservative agent will vary in accordance with the toxicity of the preservative agent, and somewhat in accordance with the character of the material treated, that is, whether the basic material is starch, a starch nitrate, a starch acetate or some other water soluble carbohydrate. In the case of highly toxic materials, amounts varying from about one-thirtieth (1/30) to one-fifth (1/5) of one per cent (1%) based on the weight of the dry film, will inhibit decay, while for the less active agents, such as borax, more will be necessary, and as much as up to four per cent (4%) may be desirable to inhibit decay in a warm humid atmosphere.

The starch plastic, including a plasticizing agent and a preservative, is spread into film form. This may be done by providing a clean polished surface of metal, such as nickel, stainless steel, aluminum and the like or nonmetallic surfaces, such as polished Bakelite, glass, rubber, and equivalent surfaces.

Any smooth polished surfaces of the character above set forth may be coated with a thin film of wax; such as carnauba wax, candelilla, paraffin, and the like, or instead of using wax, oils may be used, such as cotton seed oil, corn oil, oleostearine, etc. The starch plastic is extruded or poured on this surface and gauged down to the desired thickness by a doctor blade or scraper which moves over strips of such thickness as will produce an ultimately dried film of the desired dimensions. The dried film may vary in thickness, depending upon its specific use. When the material is used as a medicinal dressing film its thickness should vary between 0.001" and 0.003", which is also the preferred thickness when the material is used for mending purposes. Under some circumstances the film may be even thinner, and of the order of 0.0001 of an inch.

The carrier surface and the thin film starch is dried in an oven at about 160° to 185° F. for about ten (10) minutes or more. If lower temperatures are used for drying, the drying period is correspondingly longer. The temperature of drying may vary greatly, so long as the temperature is not sufficient to burn or damage the film.

It may be stated that the time of drying varies with the thickness of the film, the temperature and the relative humidity of the drying air, the velocity with which the air passes over the drying sheet, the amount of water evaporated from the sheet, and the tendency of the starch hydrate film to oxidize or "skin over". The time of drying may vary from two and three-fourths (2¾) minutes to more than an hour. The optimum conditions for a film of one-thousandth (1/1000) of an inch thick are a moisture content of eighty per cent (80%), a temperature of about 185° F.

dry bulb, and 135° wet bulb, and an air velocity of about 200 linear feet per minute. These conditions will prevent "skinning over" of a normal starch cook.

The film, after drying, is stripped from the spreading surface when the moisture content has been reduced sufficiently to produce a fairly dry film. As an example, it has been found that the film is satisfactorily dried when it has had its moisture content reduced so that the moisture content varies from twelve (12) to twenty (20) per cent of the weight of the dried starch composition film.

The removal of the film from the carrier surface is effected by picking the film from the spreading carrier surface, and then winding the film upon a roll of from about one-quarter (¼) of an inch to several inches in diameter, depending upon the type of device used and the rate of removal.

The film should be promptly unwound where short spreading is made, and if the operation is continuous, the film should pass only partly around the roll onto the other equipment for the subsequent operations.

The film produced as above set forth may have one of its surfaces coated to render the same waterproof, leaving the other surface uncoated so as to take advantage of the adhesive character of the surface and thereby provide an adhesive tape. It is within the province of this invention to omit the waterproof film and provide an adhesive tape which has an adhesive surface, said surface bonding itself to the skin surface to which it is applied.

When coating one face or surface of the film, the coating composition may be applied prior to the removal of the starch film from its carrier surface, and the application may be by means of a spray gun, by a brush, or the composition may be flowed on or printed on the surface by means of a suitable printing roll.

The waterproofed coating composition may be applied to the carrier surface and the composition dried to remove the volatile solvents. The starch plastic is then spread over this surface, drying the starch film as above described. Thereafter, the starch film carrying the waterproofing coating which is in effect a laminated sheet comprising the starch film and the waterproofing film thereon may be lifted from the carrier surface. The material may then be wound upon rolls, which are trimmed to the desired width by means of suitable cutting knives already in use for this general type of production. These rolls may then be cut into smaller widths while coiled or the rolls may be unwound and passed between slitting wheels or slitting knives and subsequently wound in coils to provide an adhesive tape of the desired width and diameter. The film may be supplied in large stock size sheets of standard dimensions, or in suitable smaller cut-to-size dimensions. In stacking these sheets, which have only one side coated or waterproofed and the other side of an adhesive character, it is obviously necessary to avoid two starch surfaces coming in contact with each other, as the adhesive nature of this material will prevent subsequent separation without destruction of the composite film.

The waterproofing composition may be formed from any suitable known waterproofing medium. However, in general the waterproofing lamination may consist of a coating resulting from applying to the starch film, solutions of the cellulose esters, of which the cellulose acetates, the nitrates and benzoates are typical examples; cellulose ethers in general, of which cellulose methyl ethyl, and benzyl ethers are examples; solutions of natural resins such as dammars, kauris, copals and the like; synthetic resins in general of which the phenol aldehydes, the glyceryl phthalates, the cumars, formaldehyde-ureas, the vinyl esters and the like are examples. The waterproofing coating may be derived from rubber solutions made from chlorinated rubbers, rubber hydrochloride, synthetic rubber solutions, such as "Thiokol."

"Thiokol" is prepared by the polymerization of chlorinated olefins with polysulfides. In the preferred form ethylene di-chloride is heated at around its boiling point with sodium polysulfide ($Na_2S_4$), in which it is used in the proportion of about two and one-half (2½) times the amount of ethylene di-chloride. The reaction is completed in about six (6) hours.

The combustion analysis of thiokol is:

|  | Percent |
|---|---|
| Carbon | 15 |
| Hydrogen | 2.5 |
| Sulphur | 82 |

One surface of the starch film may be rendered waterproof and non-adhesive by coating the same with a thin film derived from natural and synthetic waxes which may be applied from either a solution of the same, or by application in the molten state of the wax. These coating compositions are plasticized with suitable softening agents to make the resulting waterproofing film on the starch sufficiently flexible and plastic so that the final starch film carrying the waterproofing composition may be used for any of the herein described purposes.

An adhesive tape produced as herein disclosed may be used for various purposes including bandage closures and wound coverings. The self-sustaining starch film may have applied to the adhesive side of the material any of the usual surgical dressing tissues to form a composite dressing tissue having a self-sustaining starch film backing. The dressing tissue need not be applied to the entire adhesive surface of the starch film, but certain portions, and preferably the end portions of the surface film, may be free and exposed so as to adapt the composite dressing material to easily bond itself to the skin surface to which it is applied.

The starch film produced in accordance with the herein set forth method may have incorporated therein any solid or liquid material which is suited to act on the skin or through the skin to effect upon a predetermined area of the body a desired physiological or pharmacological reaction. Various pharmaceutical products, medicinals and antiseptics may be incorporated in the starch plastic prior to film formation. In general, any of the liquid or solid products tabulated in the United States Pharmacopoeia and National Dispensatory, may be incorporated in the starch film. One of the particular class of medicinals which may be incorporated in the starch plastic are antiseptics such as phenol, thymol, menthol, the benzoates, salicylates, resorcinol, ichthyol, cresol and the like. Examples of inorganic antiseptics are borax, boric acid and bichloride of mercury. Some of these products which are compatible with the starch plastic will result in retaining the transparency of the starch film, while those which are incompatible will result in a translucent or turbid starch lamination. The inorganic medicinal compounds may be added to the starch plastic in amounts varying from 1/100 of 1% up to 15%. For example, using bichloride of mercury, about 1/100 of 1% will be added to the starch plastic, based on the weight of the dry starch.

For boric acid, it is advisable to add to the starch plastic up to 5% based on the weight of the dry starch.

For the organic antiseptics and related compounds, the preferred range of percentages are from 0.5 to 4% based on the weight of the dry starch. However, the above examples are merely illustrative and are not to be taken as a limitation upon the amount of medicinal material which may be added to the starch plastic. It is obvious that the amount of medicinal which is added will vary with the character of the medicinal used, the type of skin to which the medicated film is applied, and the particular purpose for which the medicated film is applied.

In general, it may be stated that the medicinals are incorporated in the starch plastic after the plasticizing agent and preservative agents have been added to the starch, and prior to the extrusion of the starch in film form. The medicinals may be incorporated in the starch by mascerating or triturating the solid forms in either water or glycerol to form a paste and then mixing this paste with the starch plastic. As stated, various plasticizers or softening agents may be used including glycerol, di-ethylene glycol, ethylene glycol-mono-methyl ether. Concentrated sucrose solution may also be used as a plasticizer for the starch plastic.

It is preferred when liquid medicinals including pharmaceuticals are used, that the same be introduced by dispersion in the starch plastic. This may be readily accomplished by agitating the starch plastic with any mechanical device which will result in the complete and uniform dispersion of the liquid or oily type of medicinals through the starch plastics. Any mechanical device of the egg beater type functions well to accomplish the dispersion.

The following is a specific example of the preparation of a medicated starch film. The materials entering into the starch films and the amount of each material is set forth in the following table:

Table I

| | Percent |
|---|---|
| Starch | 72 |
| Di-ethylene glycol | 25 |
| Caustic soda | 2 |
| Sodium salicylate | 0.5 |
| Thymol | 0.3 |

The above mixture is mixed with 600% of water, and the mixture neutralized with phosphoric acid until the alkalinity is brought to pH 10. The specific steps of producing the plastic starch mass has previously been set forth. It is noted in the above that the plasticizer is di-ethylene glycol. The medicinal or pharmaceutical is thymol. In this particular case, the thymol also acts as a preservative. A film produced from such a mixture is inherently adhesive. This mixture may have its adhesive properties intensified by mixing the same with an adhesive-increasing agent, all as previously specified.

The plastic starch produced from the above solution is dried and formed into a film, all as described, and then provided on one side with a waterproofing coating. In order to produce the waterproofing coating the following composition is prepared:

Table II

| | Percent |
|---|---|
| Cellulose nitrate (10 sec. viscosity) | 75 |
| Dibutyl phthalate | 25 |
| Total solids | 100 |

The mixture set forth in Table II are dissolved in five unit weights in a solvent mixture of the following composition:

Table III

| | Percent |
|---|---|
| Ethyl acetate | 40 |
| Benzol | 30 |
| Methanol | 20 |
| Butyl acetate | 10 |
| Total | 100 |

The dried film is coated on one surface with the cellulose nitrate coating which carries a plasticizer such as di-butyl phthalate.

The following table sets forth an additional example of the preparation of a medicated starch film:

Table IV

| | Percent |
|---|---|
| Starch | 70% |
| Glucose | 20% |
| Caustic soda | 2% |
| Phosphoric acid | To neutralize |
| Zinc oxide | 4% |
| Borax | 4% |

In preparing the above film, the caustic soda is dissolved in water and the starch is added. The mix is then heated to the bursting point of the starch granules, cooked to clarity and maintained at the temperature which is adapted to burst the granules for twenty (20) to thirty (30) minutes. Thereafter, the cook is neutralized with phosphoric acid until the alkalinity is brought to a pH of approximately 10. Borax is dissolved in water and added to the plastic, the zinc oxide is thoroughly wetted with water and added to the plastic. The total water content approximates twelve (12) times the weight of the dry starch. Due to the high opacity of the zinc oxide pigment, this film is not transparent. It is to be noted that the transparency is prevented not by the film itself, but by an added ingredient. If the amount of zinc oxide is reduced, a translucent film can be produced.

The plastic produced from the above mass is dried and formed into a film, all as heretofore described, and then provided on one side with a waterproofing coating. In order to produce the waterproofing material, the following composition is utilized:

Table V

| | Per cent |
|---|---|
| Cellulose acetate (5 sec. viscosity) | 75 |
| Ethyl-para-toluene-sulfonamide | 25 |

The mixture set forth in Table V is dissolved in (5) unit weights of the following solvent mixture to produce the final waterproofing coating material:

| | Per cent |
|---|---|
| Acetone | 90 |
| Diacetone alcohol | 10 |

Instead of using a cellulose ester lacquer, the following waterproofing coatings may be prepared and used.

1. 
| | Per cent |
|---|---|
| Cellulose nitrate | 15 |
| Ethyl acetate | 40 |
| Di-butyl phthalate | 5 |
| Butyl acetate | 20 |
| Benzol | 12 |
| Methanol | 8 |

2. In the above composition, the cellulose nitrate may be substituted by a cellulose ether, including those specifically hereinbefore mentioned.

3. 
| | Per cent |
|---|---|
| Natural resins | 25 |
| Butyl acetate | 40 |
| Acetone | 15 |
| Benzol | 12 |
| Methanol | 8 |

The solvent mixture of the above set forth composition may be modified to meet the requirements of the various types of natural resins in order to produce a clear transparent film. It will also serve for most of the synthetic resins.

4. 
| | Per cent |
|---|---|
| Rubber solutions (solids) | 10 |
| Ethylene di-chloride | 90 |

Other solvents such as carbon bi-sulphide, acetone, solvent naphtha, etc. may be used in place of the above depending upon the particular form of rubber used in formulating the coating composition.

5. 
| | Per cent |
|---|---|
| Waxes | 6–10 |
| Solvents | 94–90 |

The solvents or solvent mixtures will depend upon the particular wax used. For paraffin, solvent naphtha may be used; for halowaxes or chlorinated naphthalenes, ethylene dichloride may be used; for true waxes such as spermacetti, carnauba and the like varying mixtures of acetone, ethyl acetate and the like may be used.

It is desired to point out that in one form of the present invention, it is desirable to use the same plasticizer for the starch film as is used for the waterproofing composition. For example, di-ethylene glycol may be used to plasticize the starch film and the nitro-cellulose coating composition. It may be stated that when both the starch film and the coating composition contain the same plasticizing agent, that this plasticizing agent which is common to each lamination of the film tends to improve the bond between the two dissimilar laminations. Instead of using di-ethylene glycol as a plasticizer for both the starch film and the coating composition, ethylene-glycol-mono-methyl-ether may be used.

While it has been stated that the common plasticizer may be used in a starch film lamination and in the waterproofing lamination, it is within the province of the present invention to use different plasticizers in these two laminations and use a separate bonding agent between the starch film lamination and the waterproofing lamination and di-ethylene glycol and ethylene-glycol-mono-methyl-ether may be used as bonding agents.

If plasticizers are already present in the starch film composition and in the waterproofing composition, then about 10% of the above compounds, based on the weight of the starch film, may be used to improve the bonding of the two laminations.

On the other hand, if the above substances or their substantial equivalents are to be used in the starch film as a plasticizer and a bonding agent, then it is preferred to have present in the starch film an amount equal to about 30% of the weight of the starch.

Corn removers, mustard plasters and the like may be made by incorporating in the starch plastic, after the cooking operation has been completed, a small percentage of the medicinal which gives the desired result. Of course, the free alkali is neutralized with phosphoric acid or its equivalent, prior to the incorporation of the medicinal compound. A corn removing film may be produced by cooking about 67½% of starch with 2% of caustic soda and incorporating therewith di-ethylene glycol as a softening agent, together with a corn removing compound such as salicylic acid. The latter should be present, preferably in an amount equal to about 5% based on the weight of the dry starch. This material is made in the form of a film, as hereinbefore described, and waterproofed with any of the waterproofing solutions herein described.

Not only may the present film be used as a medicinal tape, but it may also be used as an adhesive binding material, for example, as a mending tape, said mending tape being, preferably, produced in usual spool form.

Instead of making the film of a carbohydrate material, such as a starch derivative, the film may be made from a protein material such as gelatin, casein, albumen and the like, this protein material may be treated in all respects like the carbohydrate material and may have a plasticizer introduced therein, if the same is necessary. It is also highly desirable to introduce into the protein film a preservative to inhibit decay of the film. The protein film may have introduced into the same an adhesive intensifying agent if the protein film lacks this quality, or is deficient in this quality. The film may be waterproofed with any of the prior art waterproofing compositions, but preferably with a cellulose compound which is soluble in the organic compounds of the type herein set forth.

While the procedure herein set forth for the preparation of the water soluble carbohydrate film, and especially the starch base film, produces a substantially transparent film, the transparent qualities of the film may be improved by the addition of a clarifying agent to the plastic mass. Where the adhesive film does not carry any medicinal agent, or its equivalent, it is usually desirable to add to the plastic mass a clarifying agent. If the film does carry a medicinal agent or any addition agent which will react with the clarifying agent, then the latter should, of course, be removed. Suitable clarifying agents are the amino compounds. Most amines react with acetic pharmaceuticals adapted to be used in one form of the present invention. For example, in the corn remover film herein set forth, the salicylic acid would react with the amines, and, therefore, the amino clarifying agent should not be used. In general, it may be stated that the substituted ammonias, and their addition products, are suitable as clarifying agents. Included in this generic term are the amines, amides, imides, anilines, anilides, the cyclic nitrogen compounds, such as pyridine, quiniline, acridine and the like, as well as the hydrazines, hydroxyl amines and the oximes.

It may be stated that the more alkaline the amine, the less the amount required. However, there appears to be other aspects to the clarifying of the plastic than the alkalinity alone. Experiments indicate that the amines have the capacity of digesting and dispersing the shells of the starch granules which appear to be a form of hemi-cellulose, and thereby eliminate the slight cloudiness which results from their presence. Alkalinity alone does not produce this result.

The amount of clarifying agent added depends on the character of the starch and the particular amino compound used. Using the amines, satisfactory results are obtained by adding from one per cent (1%) to ten per cent (10%) of the weight of the dry starch. When using tetra substituted amines (such as tetrone B) and treating cassava starch, one per cent (1%) of this quaternary substituted amine, based on the weight of the dry starch, is used.

When using tri-ethanol amine and treating cassava starch, ten per cent (10%) of this amine, based on the weight of the starch is used.

Amino derivatives, such as the acet-amines, as for example, acet-amide, acet-anilide, and the like, as well as the alcohol amines, such as mono-, di and tri-ethanol-amine. The ethanol amines have the dual function of both clarifying and plasticizing the dried film and may replace some of the glycerol above referred to as a suitable plasticizer for the starch film.

"Tetrone B" marketed by Rohm and Haas of Philadelphia is a quaternary or tetra substituted ammonium with alkyl groups and with a molecular weight of approximately 170. This product is so active in its solvent power that it dissolves cellulose present in the starch, and as a result it is only necessary to add about one per cent (1%) to obtain the desired result. On the other hand, less active amino compounds must be added in greater quantities, for example, if succinamide is used, it should be added in an amount equal to about ten per cent (10%) based on the weight of the dry starch.

It is desired to state that the adhesive material which may take the form of an adhesive binding substance or an adhesive tape which is coated on one side with a suitable transparent waterproofing solution, as for example, cellulose nitrate lacquer, provides a film, the transparency of which is so nearly complete that the carbohydrate film, and more particularly the starch base film itself, is almost invisible. Usually, all that can be seen is the surface sheen of the lacquer employed, as for example, cellulose nitrate. Such adhesive tape is adapted for a variety of uses and particularly for the mending of printed matter in general, including sheets of music.

Another use for which the adhesive material of the present invention is adapted, is for the covering of books. The water soluble carbohydrate film having one face which has adhesive properties in view of the inherent adhesive properties of the material, and another face which has been made non-adhesive, either by treatment with a material which de-adhesifies or which provides a non-adhesive coating over the adhesive face, serves admirably as a wrapping material, and particularly for books. In using the material, the uncoated side of the composite starch sheet is moistened with a damp rag and the so-moistened adhesive sheet is then applied with the adhesive face directly next to the covers of the book. When dry, the covers of the book have an appearance equivalent to a duco or nitrocellulose lacquer job, with the advantage of low cost, ease of application, and the elimination of the difficulties which arise from the application of the lacquer to the book cover itself, that is, the running of the ink in the printing, due to the solvent action of the nitrocellulose solvents, and the warping effect of the book cover resulting from the shrinkage of the nitrocellulose lacquer in the drying operation.

The present invention provides a film made from a water-soluble carbohydrate material which is initially and inherently adhesive and so the film itself is adhesive. One face of this film is made non-adhesive, as by providing it with a waterproofed protective transparent coating composition.

The medicated tape herein disclosed may be used for most of the forms of local skin treatment. This includes the various skin disorders, except those which are systemic. In addition, the water soluble carbohydrate film may have incorporated therein a reactive agent or agents functioning to remove hair. These depilatory compositions are well known in the art. The invention does not reside in the particular depilatory compositions which are used. The film of the present invention may also have incorporated therein the accepted pharmaceuticals for the stimulation of hair growth. When oils or other incompatible agents are mixed into the starch plastic, a translucent to opalescent ultimate film results. As herein pointed out, the adhesive surface of the starch film may be treated with a material having a solvent action upon said surface to render the same non-adhesive. In certain of the claims, this expression or equivalent expressions have been used, and it is to be interpreted as covering the herein disclosed organic and inorganic compounds such as methanol and the higher alcohol sodium sulphate soaps and alums and borax, or their equivalents.

What is claimed is:—

1. A composite medicinal bandage comprising a thin flexible starch film, one face of which carries a waterproofing coating, and the other face has affixed thereto a flexible adhesive alkali cooked starch film carrying a medicinal agent adapted to act upon a predetermined area of the body to effect the desired physiological action.

2. A composite medicinal bandage comprising a thin flexible film composed predominantly of chemically neutral and non-adhesive starch, one face of said neutral starch film carrying a waterproofing coating, and the other face having affixed thereto a flexible adhesive alkali cooked starch film carrying a medicinal agent adapted to act upon a predetermined area of the body to effect the desired physiological action.

3. A composite transparent adhesive binding material comprising a flexible self-sustaining film consisting of a mixture of a water soluble carbohydrate provided with film-forming properties and a protein compound adapted to mix with said carbohydrate and become an integral soluble part thereof and impart adhesive properties thereto, the water-soluble carbohydrate being present in a predominating proportion and the protein being present in an amount inhibiting any substantial reduction in the transparency of the film, one face of said film carrying a non-adhesive waterproofing coating, and the other face of the film having adhesive properties.

4. A thin film-like medicinal bandage sufficiently flexible and self-sustaining to be applied directly to the skin, said bandage comprising predominately a water soluble alkali cooked carbohydrate material having self-sustaining film-forming properties, one face of said bandage having adhesive properties and the other face thereof being non-adhesive, said bandage having incorporated therein a medicinal agent adapted to act upon a predetermined area of the body to effect the desired physiological reaction.

5. A thin film-like medicinal bandage sufficiently flexible and self-sustaining to be applied directly to the skin, said bandage comprising predominately a water soluble alkali cooked carbohydrate material having self-sustaining film-forming properties, one face of said bandage being adhesive in character and the other face carrying a protective transparent waterproof coating, said bandage having incorporated therein a medicinal agent adapted to act upon a predetermined area of the body to effect the desired physiological reaction.

6. A thin film-like medicinal bandage sufficiently flexible and self-sustaining to be applied directly to the skin, said bandage comprising predominately an alkali cooked starch base having self-sustaining film-forming properties, one face of said bandage having adhesive properties, and the other face thereof being non-adhesive, said bandage having incorporated therein a medicinal agent adapted to act upon a predetermined area of the body to effect the desired physiological reaction.

7. A thin film-like medicinal bandage sufficiently flexible and self-sustaining to be applied directly to the skin, said bandage comprising predominately an alkali cooked starch base having self-sustaining film-forming properties, one face of said bandage being adhesive in character, and the other face carrying a protective transparent waterproof coating, said bandage having incorporated therein a medicinal agent adapted to act upon a predetermined area of the body to effect the desired physiological reaction.

8. A composite transparent adhesive binding material comprising a flexible self-sustaining film comprising a mixture of a water-soluble carbohydrate provided with film-forming properties, and a protein capable of imparting an adhesive characteristic to the film, the protein constituent being present in an amount not exceeding 15%, one face of said film carrying a non-adhesive waterproof coating, and the other face of the film having adhesive properties.

9. A composite transparent adhesive binding material comprising a flexible self-sustaining film comprising a mixture of starch and a protein capable of imparting an adhesive characteristic to the film, the protein constituent being present in an amount not exceeding 15%, one face of said film carrying a non-adhesive waterproof coating, and the other face of the film having adhesive properties.

10. A thin film-like medicinal bandage sufficiently flexible and self-sustaining to be applied directly to the skin, said bandage consisting predominately of a water-soluble alkali treated carbohydrate selected from the group consisting of starch derivatives, saccharides, starch gums, carbohydrate gums, pentoses, ethers and esters thereof, one face of said bandage being adhesive in character and the other face carrying a transparent waterproof coating, said bandage having been incorporated therein up to 15% of a medicinal agent adapted to act upon a predetermined area of the body to effect the desired physiological reaction.

11. A thin film-like adhesive surgical tape sufficiently flexible and self-sustaining to be applied directly to the skin, said tape comprising predominantly a water-soluble alkali treated carbohydrate material having self-sustaining film-forming properties and characterized by the property of inherent adhesiveness, one face of said surgical tape being adhesive in character adapted to bond itself to the skin, and the other face carrying a protective transparent water-proof coating.

HAROLD ALVIN LEVEY.